United States Patent [19]

Larsson

[11] 4,083,291
[45] Apr. 11, 1978

[54] DEVICE FOR CROSS-CUTTING TREE TRUNKS

[75] Inventor: Leif Larsson, Eskilstuna, Sweden

[73] Assignee: Volvo BM AB, Eskilstuna, Sweden

[21] Appl. No.: 660,793

[22] Filed: Feb. 24, 1976

[30] Foreign Application Priority Data

Mar. 6, 1975 Sweden .................................. 7502513

[51] Int. Cl.² .......................... A01G 23/08; F15B 11/04
[52] U.S. Cl. ........................................... 91/412; 91/450;
91/459; 83/801; 144/34 R
[58] Field of Search ..................... 91/411 R, 450, 459,
91/448, 412; 144/34 R; 83/795, 800, 801

[56] References Cited
U.S. PATENT DOCUMENTS 3,363,514  1/1968  Ramoke ................................. 91/410
3,590,688  7/1971  Brannon ................................. 91/412
3,848,648  11/1974 Dika ..................................... 144/34 A
3,886,985  6/1975  Iarocci ................................. 144/34 R

FOREIGN PATENT DOCUMENTS 426,625  6/1972  U.S.S.R. ........................... 144/34 R

Primary Examiner—Martin P. Schwadron
Assistant Examiner—Abraham Hershkovitz
Attorney, Agent, or Firm—Young & Thompson

[57] ABSTRACT

A device for cutting trees has two chain saws. For engaging the tree the chain saws are pivotable towards each other with the aid of feeding means. The power supplied to the saw chains is sensed and when an upper power limit is reached the feeding means is irreversibly set to the next lower of a small number of preselected feeding speeds.

3 Claims, 1 Drawing Figure

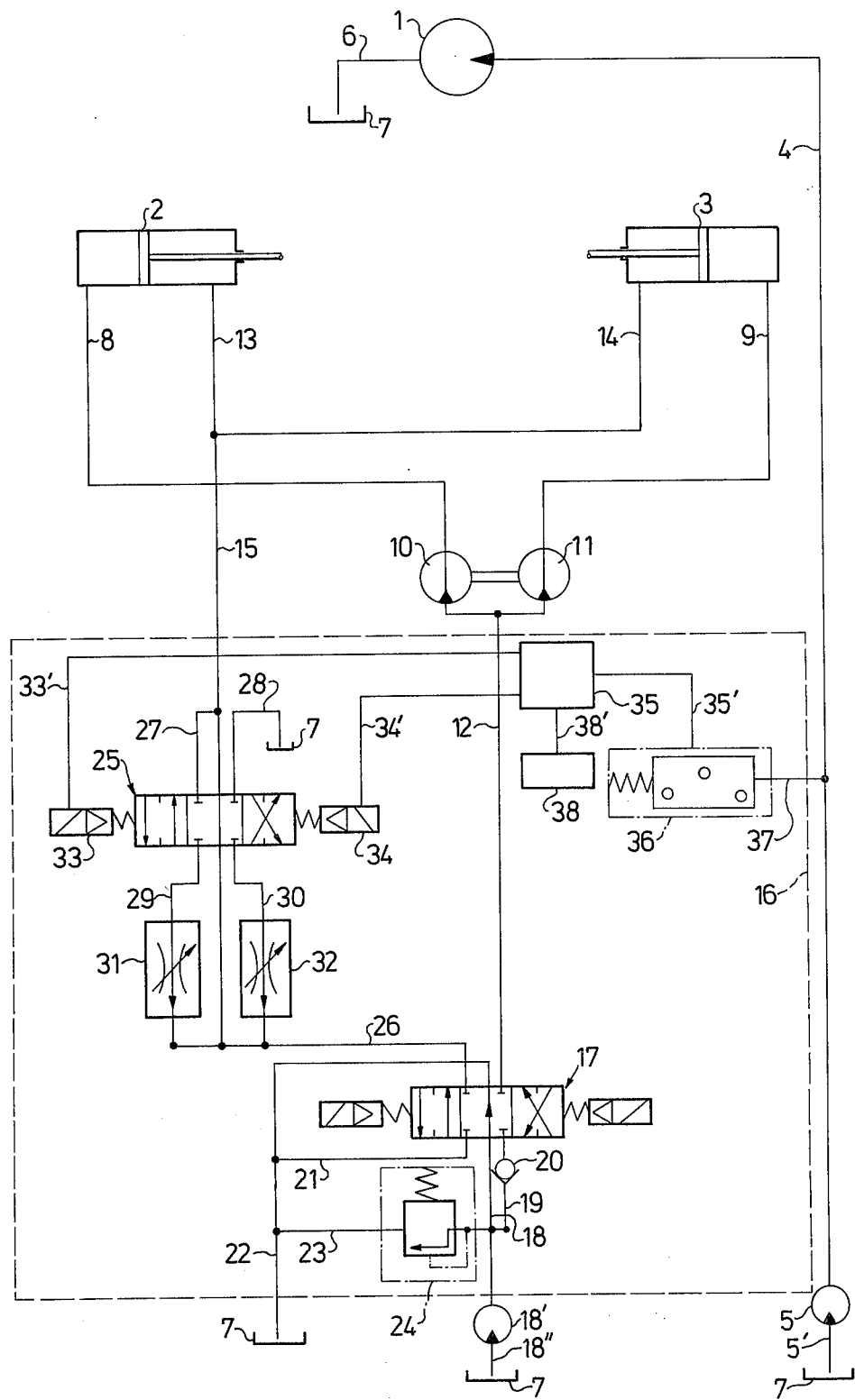

DEVICE FOR CROSS-CUTTING TREE TRUNKS

The present invention relates to a device for cross-cutting tree trunks comprising at least one cutting tool, preferably in the form of a saw chain and driving means therefor, feeding means for feeding the cutting tool into the tree trunk, and control means for controlling the feeding means. The invention is particularly related to tree felling equipment having hydraulic motor driven chain saws.

It is known to utilize a constant feed rate for the cutting tool. The rate must be selected so low that the cutting tool can still operate at maximum resistance in the tree trunk, normally at the largest diameter thereof. This feed rate is, however, unnecessarily low for the initial phase of sawing which is therefore performed with poor efficiency.

To avoid this disadvantage the feed rate can be varied continuously with the sawing resistance. The sawing time is thereby shortened since faster feeding can be carried out at the beginning of the sawing than at the end. This continuous adaption of the feed rate does, however, result in great strains on the cutting tool. As a result of irregularities in the tree structure the feeding means control device attempts, in response to the sawing resistance, to adapt the rate to each change in the structure of the tree trunk. Such great power demands are made in these short rapid speed changes that the cutting tool, e.g. the cutting chain, may stop or break.

The purpose of the present invention is to attain shorter sawing time than is possible with a constant feed rate while avoiding the disadvantages of a continuously varying feed rate.

This is accomplished according to the invention in the device mentioned in the introduction by making the control means adjustable in steps between a first setting, in which the feeding means is controlled to feed the cutting tool at high feed rate, and one or more successive settings with lower feed rates. The number of rate steps should not be large and a suitable number has been found to be three.

Change-over from higher to lower feed rate is performed automatically according to a further development of the invention. The device is furnished with sensing means adapted to sense the power supplied to the cutting tool and, when a predetermined upper power limit for each feed rate is reached, to influence the control means so that it switches the feeding means from a setting with higher feed rate to the succeeding setting with lower feed rate. The upper power limit may be the same for each rate.

When the cross-cutting device has a hydraulic motor driven cutting chain as a cutting tool, then in accordance with a preferred embodiment of the invention the sensing means are adapted to sense the pressure in a supply conduit which connects the hydraulic motor to a hydraulic pressure source. The sensing means can influence the feeding means control means electrically, hydraulically or pneumatically.

When the feeding means has a hydraulic drive motor, the control means according to the invention preferably comprises an adjustable restriction device in the motor return communication with the hydraulic fluid container of the pressure medium source. The restriction device may include one or more preferably adjustable restrictions and a switching valve for simultaneous engagement of one or more or no restrictions in the motor return communication.

An embodiment of the invention is described in detail below with reference to the accompanying drawing which shows schematically a portion of the hydraulic circuit diagram of a cross-cutting device according to the invention.

The device according to the invention for cross-cutting tree trunks is assumed, in the example below, to operate with known cross-cutting equipment comprising a vehicle-borne frame having two chain saw guide bars which can be pivoted towards and away from one another about substantially vertical axes in the frame with the aid of respective hydraulic cylinders operating between each saw bar and the frame, the two saw chains being driven by a common hydraulic motor (Swedish Patent Specification 330 602).

This known saw equipment is not described in detail below. The drawing shows only the saw motor 1 and the two feed cylinders 2 and 3. The saw motor 1 is connected via a supply conduit 4 to a hydraulic pump 5 which via a suction line 5' is connected to a hydraulic fluid tank 7. A return conduit 6 for pressure-free medium connects the saw motor 1 with the tank 7. Each of the feed cylinder 2,3 inner ends is joined via conduit 8 or 9 with one of two mechanically joined gear wheel pumps 10,11 which are driven by hydraulic medium supplied by a common supply conduit 12. The pumps 10,11 form a flow divider and ensure that the two cylinders 2,3 move uniformly. The forward cylinder spaces of the cylinders 2,3 are connected via conduits 13,14 to a common return conduit 15.

The supply of hydraulic fluid to the feed cylinders 2,3 is controlled by the control means 16 marked on the drawing with a broken rectangle. Said control means comprises a control valve 17 in the form of a three-way, three position sliding valve with electromagnetic actuation. Alternatively the control valve 17 can be influenced manually, mechanically or electro-pneumatically. On the inlet side a port in the valve 17 is connected via a supply conduit 18 to a pump 18' which via a suction line 18'' is connected to the tank 7. A second port on the inlet side of the valve 17 is also connected to the supply conduit 18 with the aid of a conduit 19 having a non-return valve 20. The third port on the inlet side of the valve 17 is connected via a conduit 21 to a return conduit 22 to the tank 7. In addition a conduit 23 having an overflow valve 24 for limiting the maximum feed pressure to the control means 16 extends between the supply conduit 18 and the return conduit 22.

In the neutral position of the control valve 17 as shown, the supply conduit 18 of the control means is directly connected to the return conduit 22. The supply conduit 12 to the hydraulic cylinders 2,3 terminates at the outlet side of the control valve 17 as does the return conduit 15 of the hydraulic cylinders. Pressure medium from the conduit 18 therefore flows pressure-free through the control valve 17 back through the return conduit 22 to the tank 7, and the hydraulic cylinders 2,3 are locked. When the control valve 17 is displaced to the right on the drawing, the supply conduit 18 is blocked, but pressure medium can flow through the conduit 19 and the non-return valve 20 to the cylinder supply conduit 12 so that feeding takes place, i.e. the chain saw bars are pivoted towards one another. Hydraulic fluid from the forward ends of the cylinders flows through the conduits 13, 14 and 15 to the control valve 17 and is connected thereby with the conduit 21 and the return conduit 22. If the control valve 17 is displaced to the left from the position shown on the drawing, pressure will instead be supplied to the feed cylinders 2,3 return conduit 15 while their supply conduit 12 is connected to the tank 7, whereby the cylinders separate the saw bars from one another.

The control means 16 also comprises a control valve 25 in the form of a three-way, three position electromagnetic valve. In the position shown on the drawing the valve 25 connects the return conduit 15 directly with a conduit 26 leading to the inlet side of the control valve 17. A second port on the inlet side of the valve 25 is connected via a conduit 27 to the return conduit 15 and a third port on the inlet side of the valve 25 is connected via a conduit 28 to the pressure medium tank 7. Two additional ports on the outlet side of the valve 25 are connected by their respective conduits 29 and 30 to the conduit 26. Adjustable restriction devices 31 and 32 in the form of pressure compensated volume control valves are mounted in the conduits 29 and 30 respectively.

The control valve 25 electromagnets 33 and 34 are connected via respective electric leads 33' and 34' to an electronic control apparatus 35. This apparatus is connected via an electric lead 35' to a hydraulic pressure operated switch 36 which via a hydraulic conduit 37 senses the pressure in the supply conduit 4 to the saw motor 1. A memory circuit 38 is connected via an electric lead 38' to the control apparatus 35. When low pressure prevails in the supply conduit 4, the valve 25 assumes the position shown on the drawing.

The rate regulation according to the invention operates in the following way. The control valve 17 is set to its right hand position whereby pressure medium is supplied to the supply conduit 12 and the feeding cylinders 2,3 for pivoting the saw bars towards a tree trunk. At the same time pressure medium is fed on the supply conduit 4 to the saw motor 1. As long as the saw chains have not encountered the tree trunk or just run in its outer portions, resistance is negligible and the pressure on the supply conduit 4 is therefore low. The control valve 25 assumes the position shown on the drawing where return flow from the feeding cylinders 2,3 is led unrestricted from the return conduit 15 through the valve 25, the conduit 26, the control valve 17, the conduit 21 and the return conduit 22 to the tank 7. Feeding is thereby performed at the highest rate. When the saw chains have worked their way deeper into the tree the resistance increases and thereby also the pressure in the supply conduit 4. At a predetermined pressure the pressure switch 36 emits a signal on the lead 35' to the control apparatus 35 which energizes the lead 33' and the electromagnet 33 so that the control valve 25 is displaced to the right. Direct flow to the conduit 26 is thereby broken and pressure medium from the return conduit 15 flows instead through the conduit 27, the valve 25 and the conduit 29 with the volume control valve 31 to the tank 7 through the control valve 17. The feed rate of the cylinders 2,3 is thereby reduced in one step to a value which can be chosen through adjustment of the valve 31.

Because a lower feed rate has been selected, the power supplied to the saw chains is reduced and thus the pressure in the supply conduit 4 falls. The switch 36 is reset and gives an opposite signal to the control apparatus 35. The memory circuit 38 prevents the control apparatus from returning the valve 25 to higher feed rate. The valve 25 is not influenced before the resistance against the saw chains increases again so that the pressure in the supply conduit 4 has again reached the predetermined level (or another predetermined value) and the pressure switch 36 emits a new signal to the control apparatus 35. This apparatus then breaks the supply of current to the electromagnet 34 so that the control valve 25 is displaced to the left. Pressure medium from the return conduit 15 thereby flows through the conduit 27, the control valve 25 and the conduit 30 with the valve 32 to the conduit 26 and the tank 7 through control valve 17. The valve 32 is adjusted for smaller volume flow than the valve 31 and lowers the feed rate of the cylinders 2,3 an additional step.

When sawing is terminated the control valve 17 is returned to its left hand position, whereby the supply conduit 12 is connected via the conduit 21 and the return conduit 22 to the tank 7. The feeding motion is terminated and thereby the pressure on the saw motor supply conduit 4 also falls so that the pressure switch 36 disengages both electromagnets 33, 34. The control valve 25 returns to the position shown on the drawing which admits unrestricted pressure medium supply from the control valve 17 through the conduit 26 and the control valve 25 to the conduit 15 which operates as a return conduit during sawing. The hydraulic cylinders 2,3 thus operate in the opposite direction and swing the saw bars away from each other.

The invention is not limited to the example described above and shown in the drawing. It is also possible within the scope of the invention to control a simple chain saw or a circular saw. The circuit shown on the drawing can also be altered to a combination of hydraulic, pneumatic and electrical control functions suitable for the intended use. For example, the pressure controlled electric switch 36 and the electromagnets 33,34 for the control valve 25 shown on the drawing may be replaced by direct hydraulic operation of the valve 25 or electrically controlled pneumatic operation.

What I claim is:

1. A device for cross-cutting tree trunks, comprising at least one cutting tool which is a saw and fluid motor driving means therefor including a fluid pressure source, feeding means for feeding the saw into the tree trunk, control means for controlling the feeding means, means for adjusting said control means in a plurality of discrete steps between a first setting in which the feeding means is caused to feed the saw with a high feed rate and one or more successive settings having lower feed rates, said feed rates differing substantially from each other, sensing means to sense the fluid pressure supplied to the fluid motor of the saw and to influence the control means when a predetermined upper fluid pressure limit for each feed rate is reached so that said control means switches the feeding means from a setting with higher feed rate to a substantially different successive setting with a stepwise lower feed rate, and blocking means connected to the connection between the sensing means and the control means to prevent the feed rate from being increased anew when the fluid pressure supplied to the saw falls after a transition to lower feed rate.

2. A device according to claim 1 in which the feeding means comprises a hydraulic drive motor, characterized in that the control means comprises an adjustable restriction device in the motor return conduit to the pressure medium source hydraulic fluid tank.

3. A device according to claim 1, in which said blocking means is an electronic control apparatus with a memory circuit.

* * * * *